United States Patent
Niessner et al.

(10) Patent No.: US 9,809,733 B2
(45) Date of Patent: Nov. 7, 2017

(54) THERMOPLASTIC MOULDING COMPOSITION WITH WATER-REPELLENT PROPERTIES

(71) Applicant: INEOS STYROLUTION GROUP GMBH, Frankfurt am Main (DE)

(72) Inventors: Norbert Niessner, Friedelsheim (DE); Philipp Boeckmann, Bad Duerkheim (DE); Matthias Mueller, Pfungstadt (DE); Ralf Engelhardt, Ludwigshafen (DE); Max Groenendijk, Enschede (NL)

(73) Assignee: INEOS STYROLUTION GROUP GMBH (DE)

( * ) Notice: Subject to any disclaimer, the term of this patent is extended or adjusted under 35 U.S.C. 154(b) by 37 days.

(21) Appl. No.: 14/890,822

(22) PCT Filed: May 20, 2014

(86) PCT No.: PCT/EP2014/060307
§ 371 (c)(1),
(2) Date: Nov. 12, 2015

(87) PCT Pub. No.: WO2014/187803
PCT Pub. Date: Nov. 27, 2014

(65) Prior Publication Data
US 2016/0096986 A1    Apr. 7, 2016

(30) Foreign Application Priority Data
May 23, 2013  (EP) ..................... 13168903

(51) Int. Cl.
*C09K 3/18* (2006.01)
*C08L 25/12* (2006.01)
*C08L 51/04* (2006.01)

(52) U.S. Cl.
CPC ............. *C09K 3/18* (2013.01); *C08L 25/12* (2013.01); *C08L 51/04* (2013.01)

(58) Field of Classification Search
CPC .................. C09K 3/18; C08L 25/12

USPC ......................................... 524/314
See application file for complete search history.

(56) References Cited

U.S. PATENT DOCUMENTS 5,344,876 A * 9/1994 Piejko ............... C08L 33/06
                                                524/504
7,887,736 B2    2/2011 Lee et al.

FOREIGN PATENT DOCUMENTS

| CN | 102977597 A | 3/2013 |
| DE | 4000544 A1 | 7/1991 |
| EP | 0465927 A1 | 1/1992 |

OTHER PUBLICATIONS

International Search Report for PCT/EP2014/060307 dated Aug. 14, 2014.
International Preliminary Report on Patentability and Written Opinion for PCT/EP2014/060307 dated Nov. 24, 2015.
English-lanugage Abstract of CN 102977597 A from Espacenet.
English-lanugage Abstract of DE 4000544 A1 from Espacenet.
English-lanugage Abstract of EP 0465927 A1 from Espacenet.

* cited by examiner

*Primary Examiner* — Deve E Valdez
(74) *Attorney, Agent, or Firm* — J.A. Lindeman & Co., PLLC

(57) ABSTRACT

It was found that water-repellent thermoplastic moulding compositions, which comprise a) from 66 to 72% by weight of one or more styrene-acrylonitrile copolymers as component A, b) from 25 to 35% by weight of one or more polyacrylate rubbers as component B, c) from 1 to 5% by weight of one or more fluorine-containing polymer components C, selected from the group of polyvinyliden-difluoride and polyvinyliden-tetrafluoride, d) from 0.05 to 6% by weight of one or more further additives, which are different from C, as component D, where each of the % by weight values is based on the total weight of components A to D and these give a total of 100% by weight, have good replication properties and lead to highly water-repellent surfaces.

14 Claims, 7 Drawing Sheets

ASA 1: Standard Luran S 757G

ASA 2: Luran S 757G + 5% Plastomoll

ASA 3: Luran S 757G + 5% Plastomoll + 5% Solef

THERMOPLASTIC MOULDING COMPOSITION WITH WATER-REPELLENT PROPERTIES

The invention relates to thermoplastic moulding compositions with water-repellent properties comprising at least one copolymer component and at least one fluorine-containing polymer component. In one aspect of the invention, a moulding produced from a thermoplastic moulding composition is provided. A further aspect of the invention relates to the use of a thermoplastic moulding composition for producing water-repellent mouldings.

Various types of water-repellent polymers have been described in the literature, such as polypropylene. The patent U.S. Pat. No. 7,887,736 discloses the preparation of water-repellent hydrophobic surfaces on thermoplastic polymers. Typical thermoplastic co-polymers for use in a variety of applications are styrene-acrylonitrile copolymers (SAN), acrylonitrile-butadien-styrene copolymers (ABS), acrylate-styrene-acrylonitrile copolymers (ASA) and styrene-butadien block copolymers (SBC).

It is one objective of the present invention to provide with thermoplastic moulding compositions with a water-repellent, in particular superhydrophobic surface. These moulding compositions can be tested based on the thermoplastic material (e.g. ASA) via injection moulding by using laser textured moulds. One objective is to develop new thermoplastic moulding compositions with water-repellent properties (e.g. ASA) which fulfill the requirements:

improve rheology of the moulding composition to sufficiently fill the mould,
achieve a good replication of the structure of the mould,
increase the hydrophobicity of the moulding composition,
achieve a water-repellent, i.e. super-hydrophobic surface, in particular in combining the composition with the right micro/nano structure.

Acrylate-styrene-acrylonitrile copolymers consist of a styrene-acrylonitrile copolymer (SAN) as matrix polymer with embedded poly-acrylate rubber domains. The main advantage of SAN as thermoplastic matrix polymer to e.g. polystyrene is the better stress crack resistance and better chemical resistance. Since SAN itself is a stiff and brittle material it is not particularly suitable for applications which need impact resistance.

To achieve the necessary impact resistance, the SAN copolymer is rubber modified, e.g. by using a polybutadiene (ABS material) and/or a polyacrylate (ASA material). A polybutadiene is often more efficient as impact modifier than a polyacrylate rubber, especially in low temperature application, but ABS often has the drawback that it is not weather resistant due to the residual double bond in the material.

Therefore, ASA is often used in outdoor applications requiring impact and weather resistant properties, which are important e.g. in the automotive sector. In the outdoor sector, the surface properties of the polymer compositions are of particular importance. Several different ASA grades are commercially available, such as Luran S®-products (of Styrolution GmbH, Frankfurt, Germany). Due to a very high MVR (melt volume rate) of commercial ®Luran S grades, the commercial ASA grade ®Luran S 757G can be particularly useful in order to achieve particular results in textured mouldings.

Referring to nature's solution of self-cleaning surfaces, known as "Lotus-Effect" based on the hydrophobic surface of the lotus leaves, one task of the invention is to mimic such an effect at the injection moulding step in order to generate a water-repellent, self-cleaning surface based on specific thermoplastic moulding compositions, e.g. compositions comprising an ASA, such as ®Luran S. One task is to adjust, in particular increase, the hydrophobicity of the thermoplastic material by using available additives without negatively influencing other properties, such as mechanical properties.

The following invention provides with a water-repellent thermoplastic moulding composition with improved properties, which comprises (or consists of):

a) from 66 to 72% by weight of one or more styrene-acrylonitrile copolymers as component A,
b) from 25 to 35% by weight of one or more polyacrylate rubbers as component B,
c) from 1 to 5% by weight of one or more fluorine-containing polymer components C, selected from the group of polyvinyliden-difluoride and polyvinyliden-tetrafluoride,
d) from 0.05 to 6% by weight of one or more further additives, which are different from C, as component D.

Each of the percent by weight values is preferably based on the total weight of components A to D and these give a total of 100% by weight.

The invention also relates to water-repellent thermoplastic moulding compositions which comprise (or consists of):

a) from 60 to 70% by weight of a styrene-acrylonitrile copolymer as component A,
b) from 28 to 33% by weight of one or more polyacrylate rubbers as component B,
c) from 1 to 5% by weight of one or more fluorine-containing polymer component C, selected from the group of polyvinyliden-difluoride and polyvinyliden-tetrafluoride,
d) from 0.5 to 6% by weight of one or more further additives as component D.

The invention also relates to a water-repellent thermoplastic moulding composition, which comprises (or consists of):

a) from 60 to 70% by weight of a styrene-acrylonitrile copolymer as component A,
b) from 28 to 33% by weight of one or more polyacrylate rubbers as component B,
c) from 1 to 4% by weight of one or more fluorine-containing polymer component C, selected from the group of polyvinyliden-difluoride and polyvinyliden-tetrafluoride,
d) from 0.5 to 6% by weight of one or more plasticizers as component D.

The invention also relates to a water-repellent thermoplastic moulding composition which comprises from 0.5 to 6% by weight of one plasticizer as component D.

The invention also relates to a water-repellent thermoplastic moulding composition which comprises at least one polyvinyliden-difluoride having a MFI (230° C./5 kg) from 6 g to 24 g/10 min.

The invention also relates to a water-repellent thermoplastic moulding composition, which comprises from 66 to 72% by weight of a styrene-acrylonitrile copolymer (SAN) as component A, having a viscosity number VN of from 50 to 120 ml/g, which is made, based on (A), from 64 to 76% by weight of at least one vinyl aromatic monomer, in particular styrene, and from 24 to 36% by weight of acrylonitrile. In a specific embodiment, the SAN matrix consists of 65% by weight of styrene, and 35% by weight of acrylonitrile.

The invention also relates to a water-repellent thermoplastic moulding composition which comprises from 25 to 35% by weight of one or more polyacrylate rubbers as component B, made by emulsion polymerization from, based on (B), from 70 to 100% (or 70 to 98%) by weight of at least one $C_{1-8}$-alkyl acrylate, and from 1 to 30% (or 1 to 29%) by weight of at least one other monoethylenically unsaturated monomer and from 1 to 10% by weight of at least one polyfunctional, cross linking monomer.

The invention also relates to a water-repellent thermoplastic moulding composition which comprises from 1 to 5%, often 1 to 4% by weight of polyvinyliden-difluoride as component C and from 0.05 to 6%, often 0.5 to 6% by weight of a dialkyl-adipate additive as component D.

According to the invention, the polyvinylidendifluoride components such as Solef 11008 and Solef 11010 of (Solvay Solexis) are particularly useful as component C; the plastiziser Plastomoll DOA (adipic acid ester of 2-ethyl-hexanol, product of BASF, Ludwigs-hafen) was particularly useful as component D.

One further aspect of the invention is a process for producing a water-repellent thermoplastic moulding composition as described above, comprising the step of mixing:
  a) from 66 to 72% by weight of one or more styrene-acrylonitrile copolymers as component A,
  b) from 25 to 35% by weight of one or more polyacrylate rubbers as component B,
  c) from 1 to 5% by weight of one or more fluorine-containing polymer components C, selected from the group of polyvinyliden-difluoride and polyvinyliden-tetrafluoride, and
  d) from 0.05 to 6% by weight of one or more further additives, which are different from C, as component D,
where each of the % by weight values preferably is based on the total weight of components A to D and these give a total of 100% by weight.

In one embodiment, a process of preparation is used, where in a first step, the components (A), (B), (C) and (D) are mixed by co-extruding, kneading or roll-milling the components at temperatures of from 180 to 300° C., and in a second step, the granulate obtained in the first step (i) is cooled.

A water-repellent moulding can be produced from a thermoplastic moulding composition as described above. A water-repellent moulding with a hydrophobic, in particular super-hydrophobic surface can be obtained by using a mould temperature of at least 110° C., preferably >110° C., in particular at least 120° C. The mould temperature ranges often are from >110° to 150° C., in many cases from 130° to 145° C.

The invention further deals with the use of a water-repellent thermoplastic moulding compositions for producing water-repellent mouldings, in particular for producing automotive parts. The use of a water-repellent moulding can be made also for producing parts of devices for health care and diagnostics.

During the experiments with the water-repellent thermoplastic moulding materials, the water contact angle was measured as one recognized reference value to monitor the hydrophobicity between the different moulding composition variations according to the invention, and in comparison with other polymer compositions. Typical unmodified polymer compositions feature contact angle against water in the range of 65-120°.

The water-repellent properties and the super-hydrophobicity of fluoropolymers such as Teflon and polypropylene in combination with a suitable texture have been described in the literature. In order to compare the surface characteristics of different unmodified polymers, the following water contact angles (WCA) were measured on plain surfaces of typical polymers:

| Teflon | 120° |
|---|---|
| Polystyrene | 93° |
| ASA | 87° |
| ABS | 83° |
| PMMA | 66°. |

The contact angle (WCA) of different SAN-matrices against water was found to depend on the AN-content in the matrix. It was observed that the contact angle increases with decreasing AN-content. As a result of that, a lower AN-content within the matrix seems to be reasonable for the target application. However a lower AN-content in the SAN-matrix influences other properties of the moulding composition, for instance the flow behavior and especially the chemical resistance.

Additionally, the influence of the rubber content in the ASA-composition (such as Luran® S) on its surface hydrophobicity was tested. The WCA-value of the standard ASA material, such as ®Luran S 757G) is 87° . The WCA-value does not change significantly for ASA-compositions with a reduced amount of rubber. The WCA difference between for example 30% and 19% by weight of acrylate-rubber content is in the range of only few degrees. Only a slight trend for higher WCA with increasing amount of rubber-content can be seen.

The amount of rubber component (B) has an influence on other properties of the thermoplastic moulding composition. A higher rubber content leads for example to an increased impact resistance but on to a decreased MVR (melt volume rate). In order to optimize the AN-content in component (A) and the rubber content (B) of the ASA-composition (®Luran S), high rubber content compositions were first tested.

As the hydrophobicity of a surface can be influenced by the addition of additives, several additives (C) and (D) were tested in amounts of 1 to 6 weight-percent (based on the total thermoplastic composition). Due to the fact that there are some additives used in standard ASA, the influence of two known representative additives in terms of WCA was analyzed.

In addition five different types of commercially available hydrophobization additives were tested. The effect on WCA-values of the known additive components (D):
  Plastomoll DOA (BASF plasticizer: di-(2-ethylhexyl)adipate) and
  Hexamoll DINCH (BASF plasticizer: 1,2-cyclohexane dicarboxylic acid, di-isononyl ester)
in ASA was evaluated, but for both additives, an amount in the range of 1 to 5% by weight showed almost no influence on the contact angle (WCA) against water on flat surface. This result was confirmed for other rubber contents independently.

Polydimethyl-siloxane (PDMS) is a polymer type used in replication techniques for natural super-hydrophobic surfaces.

Three different fluorinated polymer additives as well as two additives without fluorine were tested to verify whether they are useful for the hydrophobization of styrenic copolymers. Within the group of fluorine containing agents (polymers), the effect of three commercially available additives were tested in various styrenic copolymers:
  Solef, (polyvinylidendifluoride, grades 11008 and 11010 of Solvay Solexis)

Teflon (PTFE TE-3893 of Dupont) and

Fluorolink (AP10 P of Solvay Solexis).

The polyvinylidendifluoride (Solef 11008 (S1) and Solef 11010 (S2) of Solvay Solexis) were added (as component C) to the ASA material in amounts of 1 and 2%. The main difference between both materials is the viscosity with Solef 11010 being the material with higher viscosity [Solef 11008—MFI (230° C./5 kg): 24 g/10 min and Solef 11010—MFI (230° C./5 kg): 6 g/10 min]. For both grades, a clear and positive trend of increasing WCA with increasing amount of polyvinylidendifluoride (Solef) can be found as shown in FIG. 2 which shows the contact angle (°) as a function of additive content (% by weight).

The product Solef 11010 was particularly effective showing a significant WCA-increase of ~14° on a flat surface, even when using only 2% by weight in the thermoplastic styrenic co-polymer composition.

In addition, the surface properties of ASA were tested after adding 1 to 5% by weight of the additives, such as polyperfluoroether, a PFPE based stearylamide (Fluorolink AP10 P), Teflon as PTFE dispersion (Teflon PTFE TE-3893) and a LDPE (low density polyethylene, Lyondell Basell, Lupolen 2420 F).

The results for Teflon are shown in FIG. 3 which shows the contact angle (°) as a function of additive content (% by weight). The two fluorinated agents Teflon and Fluorolink show a significant effect on the hydrophobization, but have to be used in higher amounts, such as 5%, for high contact angles.

For the polyperfluoroether Fluorolink, even with a reduced amount of rubber in the matrix, a significant effect on the hydrophobization was found. The addition of Teflon leads to an almost linear correlation between the additive content and the WCA (°) with an angle of ~97° by adding 5% of the additive. The adding of 5% of Fluorolink shows a WCA of around 94°, although the rubber content is reduced compared with the standard grade.

Within the group of non-fluorinated additives, the effects of two commercially available additives were also tested in various styrenic copolymers:

PDMS and

Lupolen (two different grades).

In the literature, polydimethysiloxane (PDMS, e.g. of Dow Chemicals) is used to replicate structures from nature which gives superhydrophobic surface effects. Therefore, silicon oil, as a linear type of PDMS, was tested as a further additive. Due to the fact that the molecular weight of additives can have an effect on a potential migration to the surface during injection moulding, two grades with different viscosities (60000 cSt and 350 cSt) were evaluated in terms of water contact angle. The results for both grades show a small increasing effect on the surface hydrophobization of the ASA-composition.

FIG. 1 shows the contact angle (°) as a function of additive content (% by weight) and demonstrates the effect of small amounts of two polydimethylsiloxane (PDMS)-additives (components D) with different viscosities on the WCA of an ASA-composition (®Luran S) on a non-textured surface (P1: PDMS 60000 cSt; P2: PDMS 350 cST).

The effect of the 60000 cST grade was slightly stronger. In terms of WCA, the addition of 2% of PDMS with 60000 cSt lead to a WCA on flat surface of 95°. The same amount of PDMS with 350 cST results in a WCA of 92°.

Lupolen was investigated as hydrophobization additive, but it leads to a decrease of the WCA by increasing the additive content.

Out of the tested additives, the polyvinylidenedifluoride products, such as Solef, show particularly promising results concerning the hydrophobization of the ASA thermoplastic moulding compositions. Especially by using the high molecular weight polyvinylidenedifluoride (Solef 11010; fluorine content 61% by weight, m.p. about 160° C.), a significant increased WCA of up to 14° was found. The addition of Teflon and the non-fluorinated additive PDMS (60000 cST) also lead to WCA of up to 97° and 95°, but they are less preferred.

As particularly promising additives, polyvinylidenedifluorides (such as Solef 11010) can be added in the range of 0.5 to 5% by weight, mostly 1 to 5%. With only 2% of the component (C) in ASA-compositions, a water contact angle of about 100° can be achieved. PTFE (Teflon) can also be used, but here 5% is needed to reach a WCA of 97°.

The addition of 2% of the non-fluorinated additive PDMS (D) such as (60000 cST) lead to angles of up to 95°. Another interesting additive can be prepared by incorporating fluorine via pentafluorostyrene into the matrix polymer chain. Using this approach, WCA-values above 100° with low amount of fluorine content can be obtained, but pentafluorostyrene is expensive.

In a further aspect, the super-hydrophobic surface can be achieved by using a combination of the above mentioned components A, B and C with flow improving additives. Hereby investigations focus on the hydrophobicity of the ASA materials by textured moulding.

EXAMPLE 1

The ASA-copolymer ®Luran S was prepared by mass polymerisation to obtain the SAN-matrix, emulsion polymerization for the acrylate rubber, mixing of the components A and B (plus the additives) in the extruder.

The copolymer ®Luran S used comprises:

67.5% by weight of SAN-matrix (65% S, 35% AN)

30% by weight of Acrylate-rubber 2.5% by weight of standard additives.

Compounding of the different materials was done either under condition A or B, as described below. The thermoplastic moulding compositions were based on the following ASA-copolymer:

A) Extrusion
 Extruder: ZSK 30
 Screw: 55J
 Extrusion Temp.: 250° C.
 Throughput: 10 kg/h
 Screw rotation speed: 200 rpm
 Injection moulding
 Injection moulding Temp.: 280° C.
 Mould Temp.: 90° C.
B) Extrusion
 Extruder: DSM-MIDI
 Mixing: 5 min at 240° C.
 Extrusion Temp.: 250° C.
 Screw rotation speed: 80 rpm
 Force: 8000 N
 Mould Temp.: 60° C.

The following thermoplastic moulding compositions were tested

®Luran S—Rubber (A)

®Luran S—Solef 11008/Solef 11010 (A)

®Luran S/VLR—Hexamoll DINCH (A)

®Luran S—Fluorolink A 10 P (A)

® Luran S—White oil, Plastomoll DOA, Teflondisp., Silicon oil 60000cST (A)

GK 3061/107: ®Luran S—Teflondispersion (A)
®Luran S—Lupolen 2420 F (B)
®Luran S—Silicon oil 60000cST/350cST (B)
®Luran S—2,3,4,5,6-Pentafluorstyrol/2,2,3,4,4,4-Hexafluorbutylacrylat (B)
®Luran S—1H,1H,11H-Perfluoroundecylmethacrylat (B)
®Luran S—Compatibilizer VT 2421 +Heptadecafluorundecylamin (B)

EXAMPLE 2

A standard ASA material (®Luran S) and an "ASA+" material (ASA with reduced rubber content) were injection moulded by using the textured mould first generation at different conditions, changing melt and mould temperature, injection speed and injection pressure. The WCA were determined on all five fields of the mould. It turned out that changes in injection speed and pressure do not show a relevant effect on WCA-values. However, changes in melt and mould temperature showed an effect, which can be summarized as "the higher the temperatures the higher the WCA". The melt temperature was constant at 280° C. which is the highest temperature applied without risking significant thermal decomposition of the polymer material.

The "ASA+" material with a reduced amount of rubber has an increased melt flow (MVR) compared the standard ASA material. The SAN matrix copolymer per se, without any rubber particles, has an increased melt flow rate. Reducing the viscosity and improving the flowability by reducing the rubber content does not lead to the desired water repellent effect.

Two different SAN matrix materials were injection moulded at 280° C. melt temperature and 90° C. mould temperature by using the first generation mould. The viscosity numbers of the materials are VN 80 and 60 (0.5 w % in DMF). The results indicate that the replication of the material with the viscosity number 60 is significantly better than the one with VN 80. The use of a thermoplastic moulding composition with e.g. VN 60 in the final polymer can lead to a drop in mechanical properties.

Similar results were found in a test series (280° C. melt temperature) using three ASA materials featuring different rubber amount and therefore different specific melt volume rates. A 55% lower MVR (24 compared to 43) does not improve the replication quality. However, a 10° C. increased mould temperature significantly influences the quality of the replication. Compared with the peak to valley distances provided by the mould replication, the quality is improved.

Two commercially available plasticizers were compounded with ASA and their properties as flow improving additives were tested. Within this test series a polar polyester (Plastomoll DOA) and paraffin oil as non-polar agent were used. In respect of other material properties e. g. mechanical properties, additives were only used in amounts of up to 5%.

The thermoplastic moulding compositions were moulded using the textured mould. Higher mould temperatures showed better replication results and higher WCA. Experiments were done under standard conditions (280° C./90° C.) to verify the influence of the used additives.

The effect of two different flow improving agents in amounts of 1, 3 and 5% by weight on the replication behavior of ASA was tested. In the mould it can be seen that the replication quality compared to standard ASA is improved in combination with Plastomoll DOA (Di-(2-ethylhexyl)-adipate), but stays almost constant after addition of paraffin oil.

Standard ASA showed a peak to valley distances in a range of 10 to 14 µm. The addition of Plastomoll DOA has a positive effect on the replication behavior, increasing the amount from 1% to 5% leads to an increased peak to valley distance. The addition of paraffin oil even 5% seems to have no influence on the replication behavior of the material.

A very high peak to valley distance with approx. 17.5 µm was found after the addition of 5% of Plastomoll DOA. In comparison to the standard ASA material this is an improvement of around 25%. Values in the same range (17-18 µm) were also found for standard ASA in combination with mould temperatures of 100° C.

FIG. 4 shows the effect of different paraffin oil and Plastomoll DOA (plastiziser) additive (component D) content (weight-%) on the WCA (°) of an ASA-composition (®Luran S) on a textured surface (PO: paraffin oil; PL: Plastomoll DOA). The effect of Plastomoll DOA and paraffin oil on the hydrophobisation of the surface of ASA was evaluated by WCA measurements on flat surfaces as well as on the above described textured samples.

The WCA of the textured samples containing different amounts of Plastomoll DOA and paraffin oil were monitored. In comparison to usual ASA material which shows under standard conditions (280° C./90° C.) WCA of around 140°, the addition of both additives significantly increase the contact angle against water. Increasing the amount of additives (from 1% to 5%) leads in both cases to WCA between 148° and 152°. Especially the addition of 5% of Plastomoll DOA leads to an improvement of about 12° compared to standard ASA and shows an contact angle of 152°, which is above the target line of WCA>150°, which characterized a super-hydrophobic surface.

Higher mould temperatures lead to an improved replication behavior and higher WCA on textured surfaces of the standard ASA material as well. By using a mould temperature of 100° C., contact angles against water in the range of 149° were found. The mould temperature also has an effect on the replication quality.

A laser-textured mould was manufactured giving the opportunity to change the temperature during the moulding step. This is of interest for the process, as the use of variothermic equipment can lead to better moulding results.

This second generation mould had five textured areas featuring dimples with different depths. The hexagonal arranged dimples had a distance of 30 µm.

The mould temperature has a significant influence on the replication behaviour. The dimple size increases with an increasing moulding temperature, showing the best result at 135° to 145° C. mould temperature, in particular 140° C. Nevertheless even at 140° C. not all dimples are fully filled over all fields. In comparison with the first generation mould, replication quality is significantly improved even under standard conditions (280° C. melt and 90° C. mould temperature). On all five fields of the mould, an improved replication quality in the range of 5-12% (replication of the respective highs) is found using standard conditions and ASA material. These results clearly indicate that the selected dimple structure (mould second generation) is the preferred geometry in order to get a good replication quality.

Hydrophobisation experiments made with a drop of water (20 µl) showed a super-hydrophobic surface of the materials tested. This effect was found for all five fields of the mould for 120° C. and 140° C. samples. A moulding temperature higher than 110° C. seems to be required to achieve a super-hydrophobic surface using this specific texture in combination with standard ASA material. Interestingly it turned out that WCA in the range of >130° seems to be high enough in order to achieve a water-repellent effect.

In addition the effect on the replication behavior after adding flow improving additives in amounts of 1, 3 and 5% showed under standard conditions (280° C./90° C.) an improvement of the replication behavior of up to 25% by using Plastomoll DOA. Investigations of the WCA of these samples showed a significantly improved surface hydrophobicity of the material with values above the target value of 150°.

FIG. 5 shows a photo (SEM; 450:1) of the textured surface of a standard ASA-composition without additive prepared by using a mould-temperature of 140° C.; the dimple size and structure (dimple-distance about 100 µm) demonstrate a perfect texture of the water-repellent surface.

FIG. 6 shows a photo (SEM; 450:1) of the textured surface of a standard ASA-composition without additive prepared by using a mould-temperature of 90° C.; the dimple size and structure demonstrate an insufficient texture of the surface.

In order to generate a super-hydrophobic surface for an ASA thermoplastic moulding composition, for industrial applications, it is appropriate to use a combination approach.

Using a combination of specific plasticizers (in a defined amount) as flow improving agents, of a specific hydrophobization additive (in a defined amount) and/or a high temperature moulding step (such as >110° to 150° C., often from 130° to 145° C.) allows creating the desired thermoplastic moulding material. The combination of components C, such as Solef 11010, being a very promising hydrophobisation additive, with the component D, e.g. the plasticizer Plastomoll DOA, shows very promising results concerning the replication behavior, in particular with a mould temperature >110° C.

The following mechanical properties of the new ASA materials (ASA2-4) in comparison with standard (ASA1) were found:

| Experiments | | | | |
|---|---|---|---|---|
| ®Luran S | 100 | 95 | 92 | 90 |
| Plastomoll DOA | | 5 | 8 | 5 |
| Solef 11010 | | | | 5 |
| Total | 100% | 100% | 100% | 100% |

| | Tests Method | | | | |
|---|---|---|---|---|---|
| | Unit | | | | |
| Charpy ak (23° C.) | kJ/m$^2$ | 12.3 | 15.8 | 18.5 | 15.9 |
| Charpy an (23° C.) | kJ/m$^2$ | 194 | 218 | 201 | 200 |
| Puncture | J | 30.2 | 29.9 | 25.7 | 29.7 |
| Elongation | % | 8.4 | 3.3 | 10.3 | 10.5 |

Figure 1:
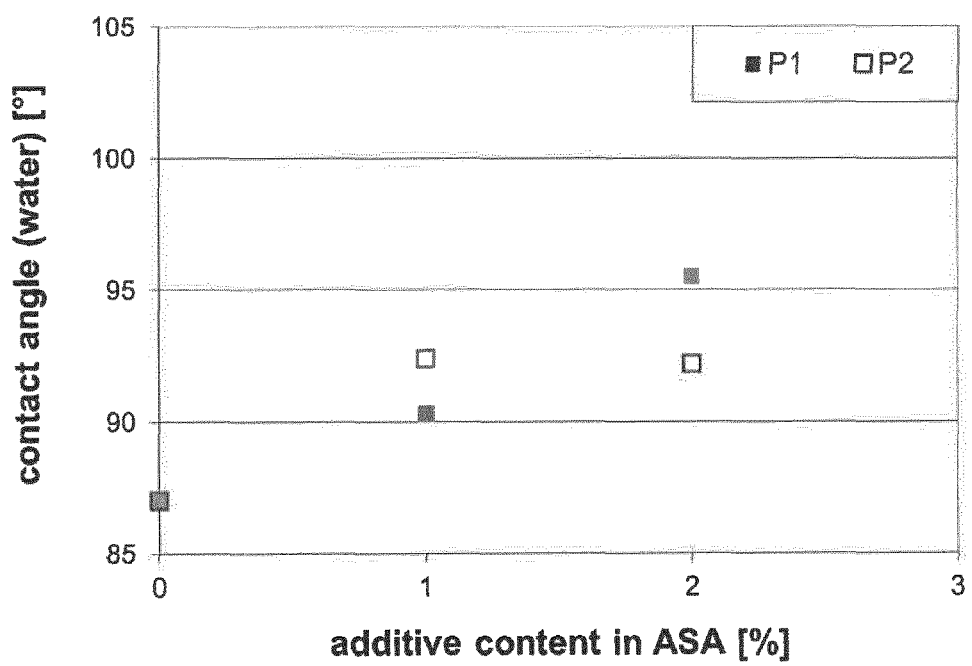
FIG. 1 shows the effect of small amounts of two polydimethylsiloxane (PDMS)-additives on the WCA of an ASA-composition (®Luran S) on a non-textured surface (P1: PDMS 60000 cSt; P2: PDMS 350 cST).
Figure 2:
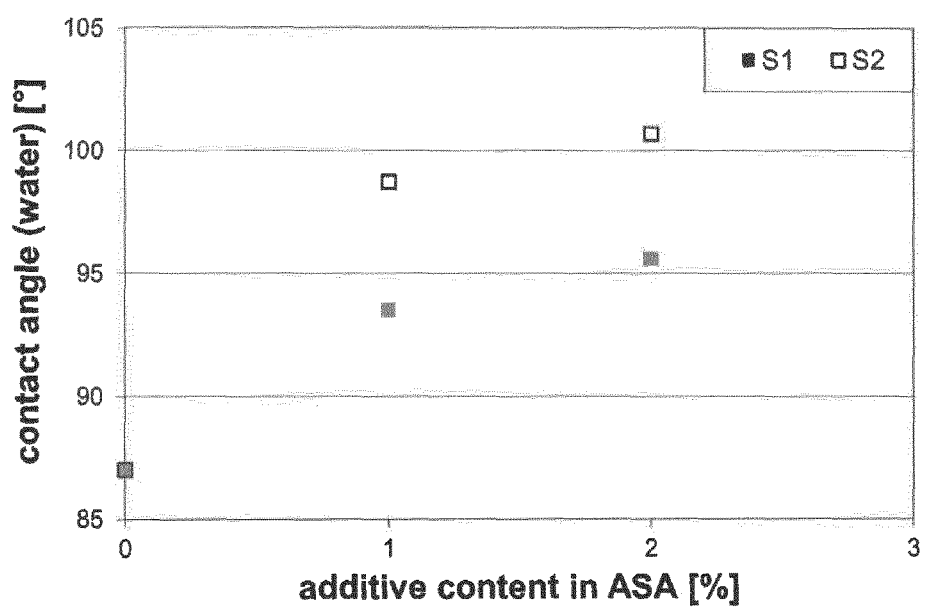
FIG. 2 shows the effect of two polyvinylidendifluoride-polymer additives (Solef-grades) on the WCA of an ASA-composition (®Luran S) on a non-textured surface (S1: Solef 11008; S2: Solef 11010).
Figure 3:
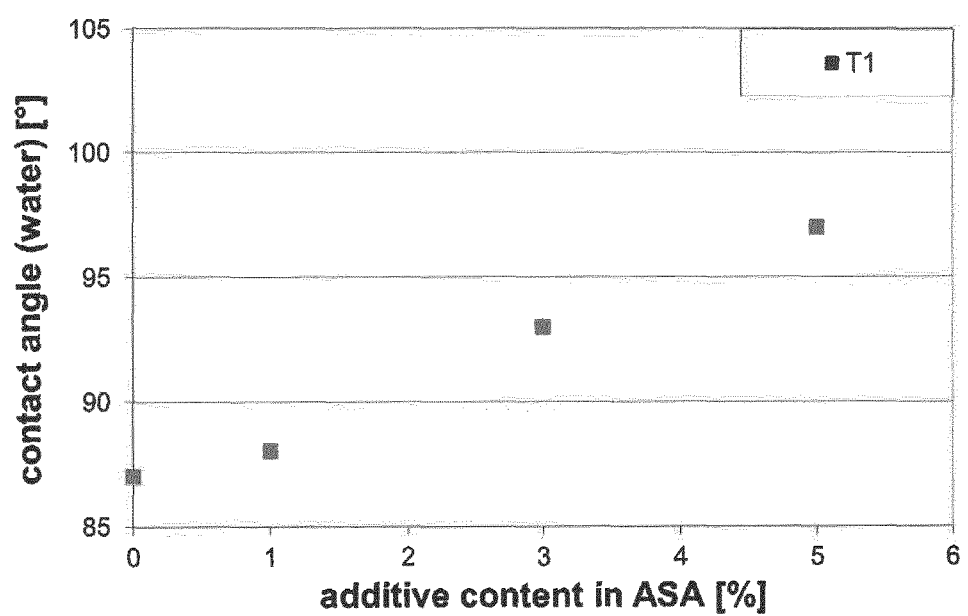
FIG. 3 shows the effect of Teflon additive on the WCA of an ASA-composition (®Luran S) on a non-textured surface (T1: PTFE TE-3893).
Figure 4:
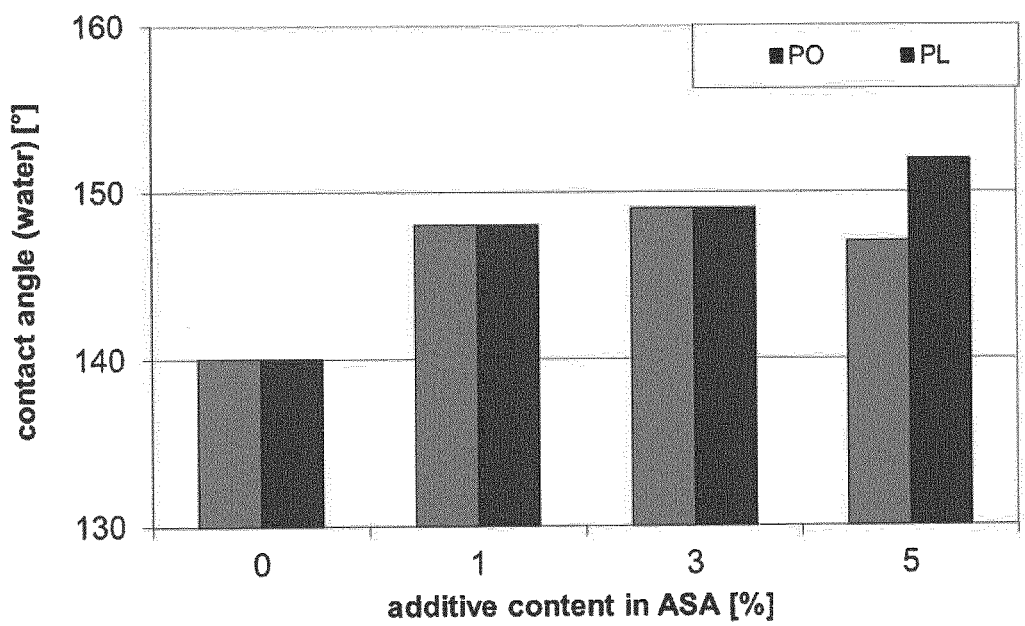
FIG. 4 shows the effect of paraffin oil and Plastomoll DOA (plastiziser) additives on the WCA of an ASA-composition (®Luran S) on a textured surface (PO: paraffin oil; PL: Plastomoll DOA).
Figure 5:
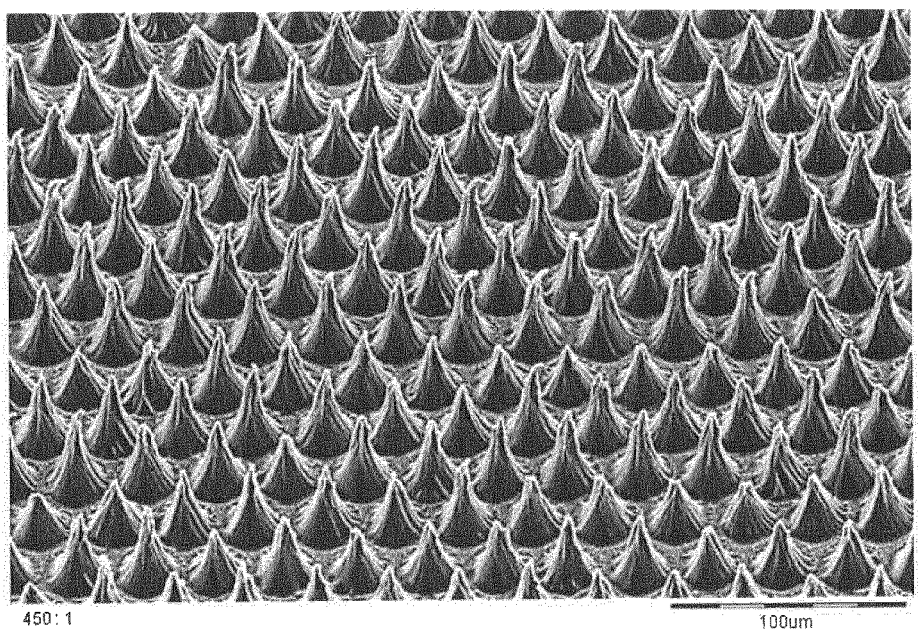
FIG. 5 shows a photo (SEM) of the textured surface of a standard ASA-composition without additive prepared by using a mould-temperature of 140° C.; the dimple size and structure demonstrate a perfect texture of the water-repellent surface.
Figure 6:
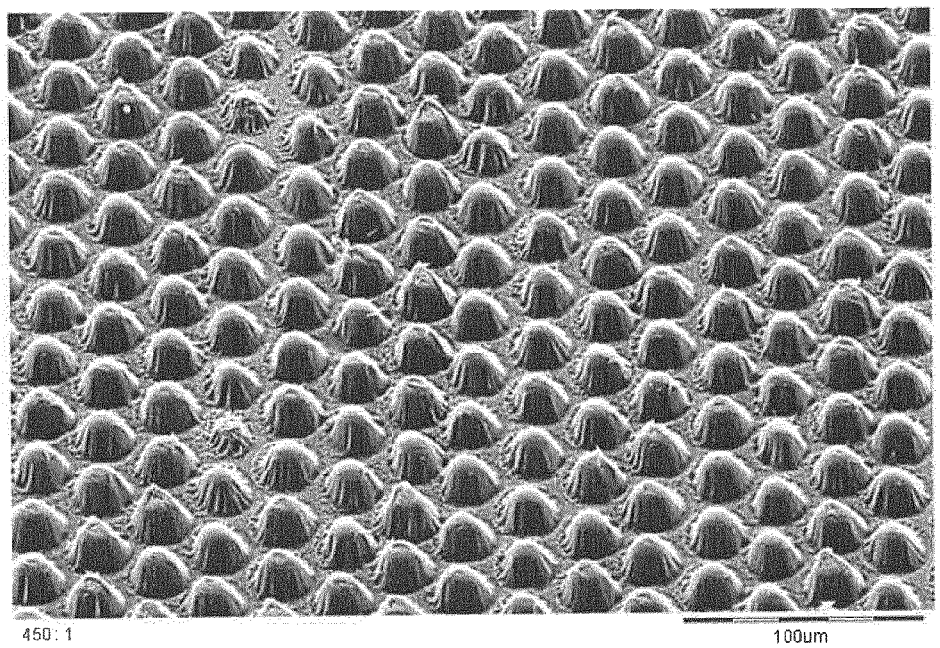
FIG. 6 shows a photo (SEM) of the textured surface of a standard ASA-composition without additive prepared by using a mould-temperature of 90° C.; the dimple size and structure demonstrate an insufficient texture of the surface.
Figure 7:
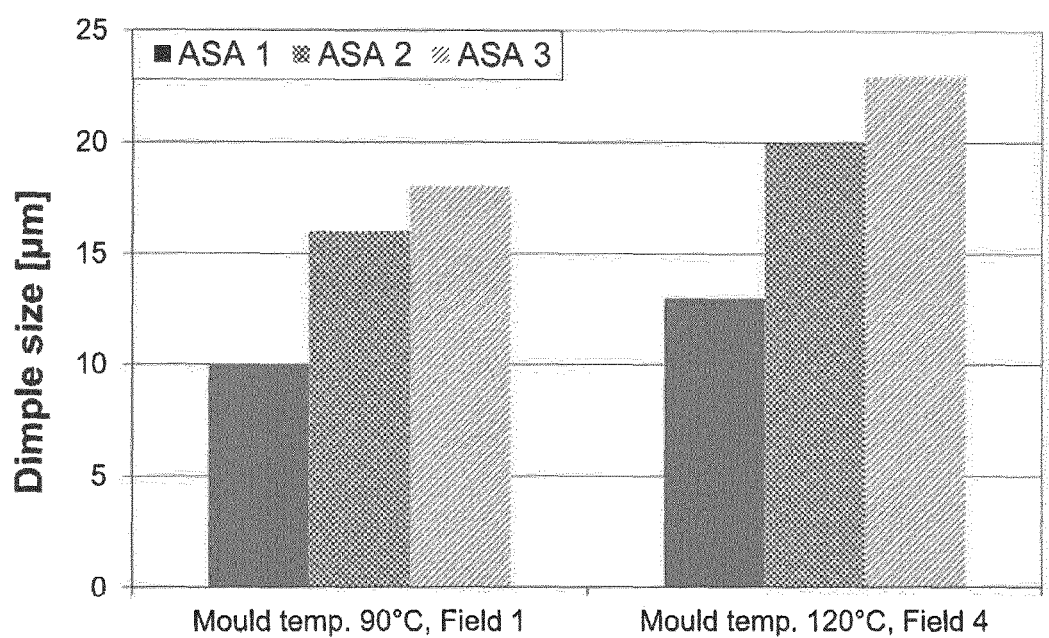
FIG. 7 shows different dimples sizes (in µm), which are equatable with the replication quality, of ASA-compositions 1, 2 and 3 by using either 90° C. or 120° C. mould temperature. As it can be seen, a higher mould temperature (such as >110° to 150° C., often from 130° to 145° C.) allows creating better dimple sizes for the thermoplastic moulding material. The dimple sizes for ASA-compositions comprising components A, B, C and D were particularly high, which leads to improved properties with respect tp replication of structures. The dimples also have an increased hydrophobicity and water-repellent surfaces.

Corresponding experiments with water-repellent thermoplastic ABS-moulding compositions, which comprise:
  a) from 66 to 72% by weight of one or more styrene-acrylonitrile copolymers as component A,
  b) from 25 to 35% by weight of one or more polybutadien-rubbers as component B,
  c) from 1 to 5% by weight of one or more fluorine-containing polymer components C, selected from the group of polyvinyliden-difluoride and polyvinyliden-tetrafluoride,
  d) from 0.05 to 6% by weight of one or more further additives, which are different from C, as component D, also are leading to good results. Typical commercial ABS products, such as ®Terluran of Styrolution (Frankfurt, Germany) can be used for these moulding compositions.

The invention claimed is:

1. A water-repellent thermoplastic moulding composition, which comprises:
  a) from 66 to 72% by weight of one or more styrene-acrylonitrile copolymers as component A,
  b) from 28 to 33% by weight of one or more polyacrylate rubbers as component B,
  c) from 1 to 5% by weight of one or more fluorine-containing polymer components C, selected from the group consisting of polyvinyliden-difluoride and polyvinyliden-tetrafluoride,
  d) from 0.05 to 6% by weight of one or more plasticizers, which are different from C, as component D,
where each of the % by weight values is based on the total weight of components A to D and these give a total of 100% by weight.

2. A water-repellent thermoplastic moulding composition according to claim 1, which comprises:
  a) from 66 to 70% by weight of a styrene-acrylonitrile copolymer as component A,
  b) from 28 to 33% by weight of one or more polyacrylate rubbers as component B, c) from 1 to 5% by weight of one or more fluorine-containing polymer component C, selected from the group consisting of polyvinyliden-difluoride and polyvinyliden-tetrafluoride, d) from 0.5 to 6% by weight of one or more further plasticizers as component D.

3. A water-repellent thermoplastic moulding composition according to claim 1, which comprises:
   a) from 66 to 70% by weight of a styrene-acrylonitrile copolymer as component A,
   b) from 28 to 33% by weight of one or more polyacrylate rubbers as component B,
   c) from 1 to 4% by weight of one or more fluorine-containing polymer component C, selected from the group consisting of polyvinyliden-difluoride and polyvinyliden-tetrafluoride,
   d) from 0.5 to 6% by weight of one or more plasticizers as component D.

4. A water-repellent thermoplastic moulding composition according to claim 1, which comprises from 0.5 to 6% by weight of dialkyl-adipate as component D.

5. A water-repellent thermoplastic moulding composition according to claim 1, which comprises at least one polyvinyliden-difluoride having a MFI (230° C./5 kg) from 6 g to 24 g/10 min.

6. A water-repellent thermoplastic moulding composition according to claim 1, which comprises from 66 to 72% by weight of a styrene-acrylonitrile copolymer as component A, having a viscosity number VN of from 50 to 120 ml/g, made, based on (A), from 64 to 76% by weight of at least one vinyl aromatic monomer, and from 24 to 36% by weight of acrylonitrile.

7. A water-repellent thermoplastic moulding composition according to claim 1, which comprises from 28 to 33% by weight of one or more polyacrylate rubbers as component B, made by emulsion polymerization from, based on (B), from 70 to 98% by weight of at least one C1-8-alkyl acrylate, and from 1 to 29% by weight of at least one other monoethylenically unsaturated monomer and from 1 to 10% by weight of at least one polyfunctional, cross linking monomer.

8. A water-repellent thermoplastic moulding composition according to claim 1, which comprises from 1 to 4% by weight of polyvinyliden-difluoride as component C and from 0.05 to 6% by weight of an dialkyl-adipate additive as component D.

9. A process for producing a water-repellent thermoplastic moulding composition according to claim 1, comprising the step of mixing the components:
   a) from 66 to 72% by weight of one or more styrene-acrylonitrile copolymers as component A,
   b) from 28 to 33% by weight of one or more polyacrylate rubbers as component B,
   c) from 1 to 5% by weight of one or more fluorine-containing polymer components C, selected from the group consisting of polyvinyliden-difluoride and polyvinyliden-tetrafluoride, and
   d) from 0.05 to 6% by weight of one or more plasticizers, which are different from C, as component D, where each of the % by weight values is based on the total weight of components A to D and these give a total of 100% by weight.

10. The process according to claim 9, where in a first step, the components (A), (B), (C), and (D) are mixed by co-extruding, kneading, or roll-milling the components at temperatures of from 180 to 300° C., and in a second step, the granulate obtained in the first step is cooled.

11. A water-repellent moulding produced from a thermoplastic moulding composition according to claim 1.

12. A method of use of a water-repellent thermoplastic moulding composition, according to claim 1 for producing water-repellent mouldings.

13. A method of use of a water-repellent moulding according to claim 11 for producing automotive parts.

14. A method of use of a water-repellent moulding according to claim 11 for producing parts of devices for health care and diagnostics.

* * * * *